(12) United States Patent
Ozawa (10) Patent No.: US 10,545,726 B2
(45) Date of Patent: Jan. 28, 2020

(54) SERVER DEVICE, CALCULATION METHOD AND NON-TRANSITORY RECORDING MEDIUM RECORDING PROGRAM

(71) Applicant: CASIO COMPUTER CO., LTD., Shibuya-ku, Tokyo (JP)

(72) Inventor: Makoto Ozawa, Tachikawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 103 days.

(21) Appl. No.: 15/709,107

(22) Filed: Sep. 19, 2017

(65) Prior Publication Data

US 2018/0081635 A1 Mar. 22, 2018

(30) Foreign Application Priority Data

Sep. 20, 2016 (JP) ................................. 2016-182611

(51) Int. Cl.
*G06F 7/544* (2006.01)
*H04L 29/06* (2006.01)
*H04L 29/08* (2006.01)

(52) U.S. Cl.
CPC .............. *G06F 7/544* (2013.01); *H04L 67/42* (2013.01); *H04L 67/18* (2013.01)

(58) Field of Classification Search
None
See application file for complete search history.

(56) References Cited

U.S. PATENT DOCUMENTS

| 4,595,980 A * | 6/1986 | Innes ...................... G06F 9/454 704/8 |
| 5,751,957 A | 5/1998 | Hiroya et al. |
| 2014/0095518 A1* | 4/2014 | Schneider ................ G06F 7/24 707/754 |

FOREIGN PATENT DOCUMENTS

| JP | 09081569 A | 3/1997 |
| JP | 2005135088 A | 5/2005 |
| JP | 2016099976 A | 5/2016 |

* cited by examiner

*Primary Examiner* — Michael D. Yaary
(74) *Attorney, Agent, or Firm* — Holtz, Holtz & Volek PC (57) ABSTRACT

A server device capable of appropriately determining country information, and automatically and appropriately setting a calculation method according to the country represented by the country information, to perform calculation, even if a user does not set the calculation method or the country information, is provided. A server device includes a data reception unit that receives calculation target data and calculation type data from a terminal; a country information acquisition unit that acquires country information of the terminal; a calculation unit that performs calculation of the calculation target data with a calculation method according to the country information regarding the calculation type data; and a calculation result transmission control unit that controls to transmit, to the terminal, calculation result data being a calculation result.

11 Claims, 5 Drawing Sheets

| REGIST-RATION ID | CALCULATION TYPE | CALCULATION TARGET DATA | COUNTRY INFORMATION | TEACHING MATERIAL INFORMATION | TERMINAL ID |
|---|---|---|---|---|---|
| 1 | SINGLE-VARIABLE STATISTICAL CALCULATION | 1, 2, 3, 4 | US | ○○PRESS MATH 2ND P55 Q2 | 0000 |
| 1 | FUNCTION EXPRESSION CALCULATION | $y1 = 1\frac{1}{3}x$ | JAPAN | ○○PRESS MATH 2ND P55 Q1 | 0000 |
| ⋮ | ⋮ | ⋮ | ⋮ | ⋮ | ⋮ |

SERVER DEVICE, CALCULATION METHOD AND NON-TRANSITORY RECORDING MEDIUM RECORDING PROGRAM

TECHNICAL FIELD

The present disclosure relates to a server device, a terminal, a calculation method, and a recording medium recording a program, and in particular relates to a server device, a calculation method, and a program that perform calculation of calculation target data transmitted from a terminal.

RELATED ART

Conventionally, a mathematical application is known such as a scientific calculator that operates on a browser. For example, in a case where such a mathematical application is an application that graphically displays a function expression, the application is configured such that, when a user inputs the function expression, calculation range, step, and the like, variables to be assigned to the function expression is determined from the input calculation range and step, on the browser, and each of the variables is assigned to the function expression and calculation is performed, and a calculation result is plotted on a graph, whereby the input function expression is graphically displayed.

For example, JP 2016-099976 A describes a calculation server and the like in which a function expression input into a terminal by a user is transmitted to a server device, calculation as described above is performed by the server device, and a series of calculation results and the like are transmitted to the terminal, and graphically displayed on the terminal.

SUMMARY

A method for calculating a certain type of function expression may differ depending on countries. For example, the function expression of Equation (1) below is calculated as $y=(1+\frac{1}{3}) \cdot x$ in Japan, but is calculated as $y=1 \cdot \frac{1}{3} \cdot x$ in Europe, the United States, and the like (hereinafter, referred to as a method for calculating a function expression expressed by a mixed fraction). That is, the mixed fraction is allowed to be used in the function expression in Japan, but the mixed fraction is not allowed to be used at least in the function expression in Europe, the United States, and the like.

[Mathematical Formula 1]

$$y = 1\frac{1}{3}x \quad (1)$$

In addition, in a case where a minimum value (minX), a lower quartile value (Q1), a median value (Med), an upper quartile value (Q3), and a maximum value (maxX) are obtained in single-variable statistical calculation, a method for calculating Q1 and Q3 is different between the method in France and the method in Japan and the United states.

That is, a standard method is adopted in Japan and the United States. In the standard method, in a case where the number of elements n is an even number, all elements of a population are divided into a lower half group and an upper half group based on the median value of the entire population, and then Q1 and Q3 are calculated as Q1=a median value of a group of n/2 from the bottom of the entire population, and Q3=a median value of a group of n/2 from the top of the entire population. In addition, in a case where the number of elements n is an odd number, an element of the median value is removed from all elements of the population, and the remaining elements are divided into a lower half group than the median value and an upper half group than the median value, and then Q1 and Q3 are calculated as Q1=a median value of a group of (n−1)/2 from the bottom of the entire population, and Q3=a median value of a group of (n−1)/2 from the top of the entire population.

On the other hand, an OnData method is adopted in France. In the OnData method, when the number of elements included in a population as a calculation target is n, Q1 and Q3 are calculated as Q1=a data value of an element whose cumulative frequency ratio is ¼ or more and that has a value closest to ¼, and Q3=a data value of an element whose cumulative frequency ratio is ¾ or more and that has a value closest to ¾.

For that reason, in a case of a population with four elements of, for example, 1, 2, 3, and 4, Q1=1.5 and Q3=3.5 when calculated with the standard method, but Q1=1 and Q3=3 when calculated with the OnData method. In this way, values of Q1 and Q3 calculated may be different between the standard method and the OnData method.

For that reason, there has been a problem that it takes time and effort for the user to set the calculation method or input country information during SETUP, which makes the user feel inconvenient.

The present disclosure has been made in view of the above problem, and it is an object to provide a server device, a terminal, a calculation method, and a program recording medium capable of appropriately determining country information, and automatically and appropriately setting a calculation method according to the country represented by the country information, to perform calculation, even if the user does not set the calculation method or the country information.

In order to solve the above problem, a server device according to the present discloser comprises: a processor, wherein the processor is configured to: receive calculation target data and calculation type data from a terminal; acquire country information; perform calculation of the calculation target data with a calculation method according to the country information regarding the calculation type data; and transmit calculation result data that is a calculation result calculated by the calculation unit, to the terminal.

BRIEF DESCRIPTION OF DRAWINGS

FIG. 2 is a flowchart describing operation of a CPU of the terminal and the like;

FIG. 4 is a flowchart describing operation of a CPU of the server device according to the present embodiment and the like;

DETAILED DESCRIPTION

Hereinafter, embodiments of a server device, a calculation method, and a program according to the present disclosure will be described with reference to the drawings. Incidentally, the scope of the present disclosure is not limited to illustrated examples.

Figure 1:
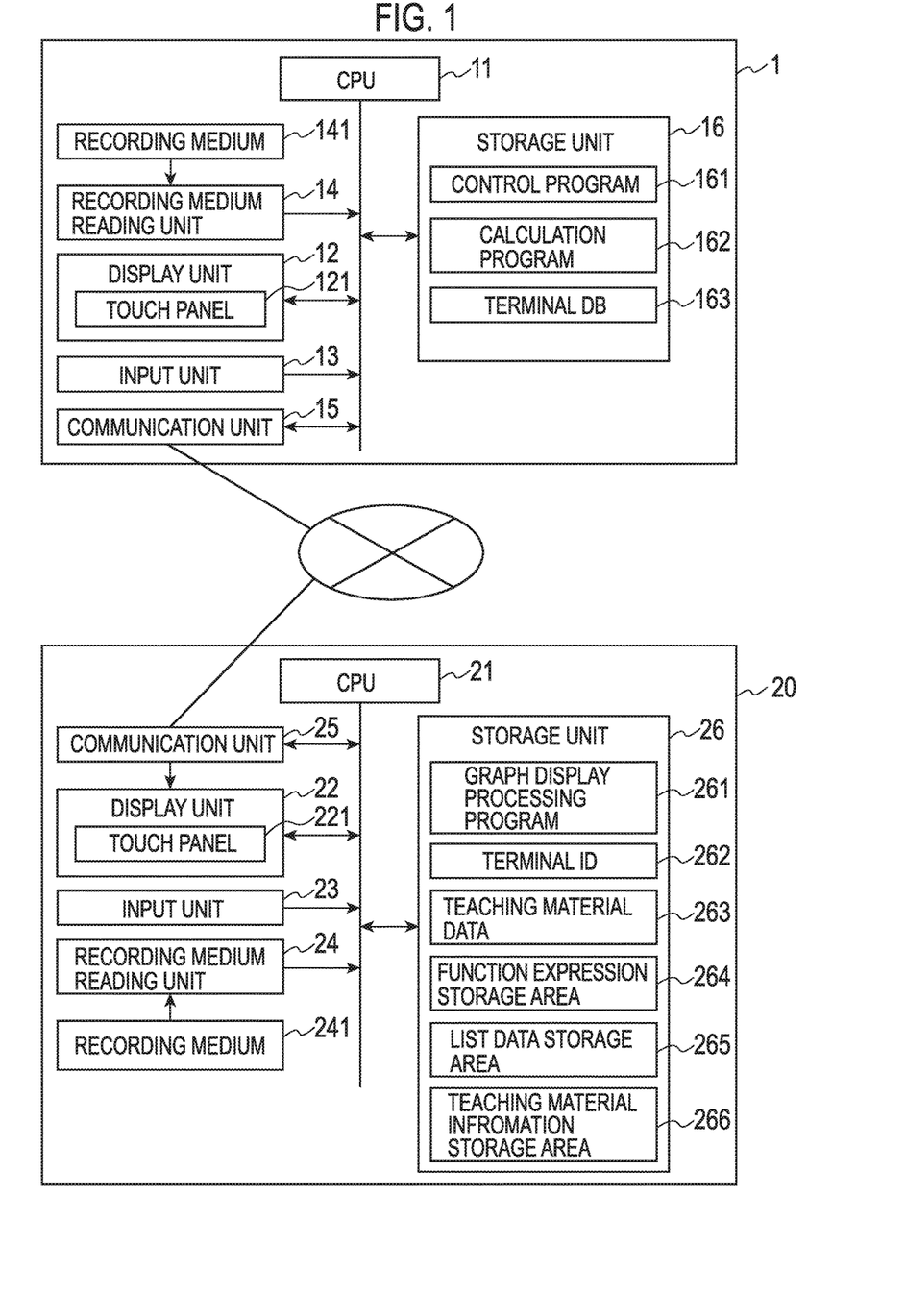
FIG. 1 is a block diagram illustrating internal configurations and the like of a server device and a terminal according to a present embodiment.

FIG. 1 is a block diagram illustrating internal configurations and the like of a server device and a terminal according to a present embodiment. FIG. 1 illustrates a server device 1 and one terminal; however, multiple terminals are connected to the server device 1 via a network in actual cases. The server device 1 includes a central processing unit (CPU) 11, a display unit 12, an input unit 13, a recording medium reading unit 14, a communication unit 15, and a storage unit 16 that are connected to a bus.

The display unit 12 displays various types of information on a display not illustrated, in accordance with control from the CPU 11. Incidentally, as illustrated in FIG. 1, it is also possible to provide a touch panel 121 on the display of the display unit 12 so that a user can perform operation such as input by, for example, touching the touch panel 121.

The input unit 13 includes a keyboard, a numeric keypad, and a mouse that are not illustrated, and outputs details input by the user by operating the keyboard or the like, to the CPU 11. The recording medium reading unit 14 can read information from a recording medium 141 detachably mounted.

The communication unit 15 receives data (for example, calculation target data and calculation type data described later) and the like transmitted from a terminal 20 via the network, and transmits data (for example, calculation result data described later) and the like from the server device 1 via the network to the terminal 20 in accordance with an instruction of the CPU 11.

The storage unit 16 includes read only memory (ROM) and random access memory (RAM), and stores a control program 161 that controls the entire server device, a calculation program 162 that is a program according to the present disclosure, and the like. In addition, the storage unit 16 also stores a terminal DB 163 that stores the calculation target data transmitted from the terminal 20, data related to the terminal 20, and the like. Incidentally, a specific configuration of the terminal DB 163 will be described later.

The CPU 11 controls operation of the server device 1. Specifically, the CPU 11 reads the control program 161 store in the storage unit 16 and a program specified from among various application programs to deploy them on a work area of the RAM, and executes various types of processing in cooperation with the program deployed on the RAM. In addition, the CPU 11 controls and causes the communication unit 15 to transmit data (for example, the calculation result data described later) and the like to the terminal 20 via the network.

The terminal 20 includes a CPU 21, a display unit 22, an input unit 23, a recording medium reading unit 24, a communication unit 25, a storage unit 26, and the like that are connected to a bus.

Incidentally, the terminal 20, as far as it can transmit the calculation target data and the like to the server device 1, may be any type of the terminal, for example, a computer such as a personal computer, a tablet terminal, and a smartphone, and may be a dedicated terminal. In addition, in JP 2016-099976 A described above, a case is described where a two-dimensional code such as a QR code (registered trademark) displayed on a scientific calculator is shot and transmitted. Also in the present disclosure, a two-dimensional code converted from the calculation target data may be shot and transmitted; however, it is not necessarily to be done so.

Also in the terminal 20, it is possible to configure the display unit 22, the input unit 23, the recording medium reading unit 24, and the communication unit 25 similarly to the case of the server device 1.

In addition, the storage unit 26 of the terminal 20 stores various programs such as a calculation result display program 261 for graphically displaying function expression data on the display unit 22 on the basis of the calculation result data transmitted from the server device 1, and a terminal ID 262 that is an identification information of the terminal 20 itself, and in addition a teaching material data 263 such as an electronic textbook.

In addition, the storage unit 16 is provided with a function expression storage area 264 and a list data storage area 265 that temporarily store function expression data and list data currently input by a student or the like by using the terminal 20, and a teaching material information storage area 266 that temporarily stores information such as a question number, page, teaching material name, and publisher of a teaching material such as an electronic textbook on which questions being solved by the student or the like are posted (hereinafter, referred to as teaching material information).

Then, the CPU 21 controls operation of the terminal 20, and the CPU 21 reads various programs stored in the storage unit 26 to deploy the programs on a work area of the RAM, and executes various types of processing in cooperation with the programs deployed on the RAM.

[Operation of the Terminal]

Figure 2:
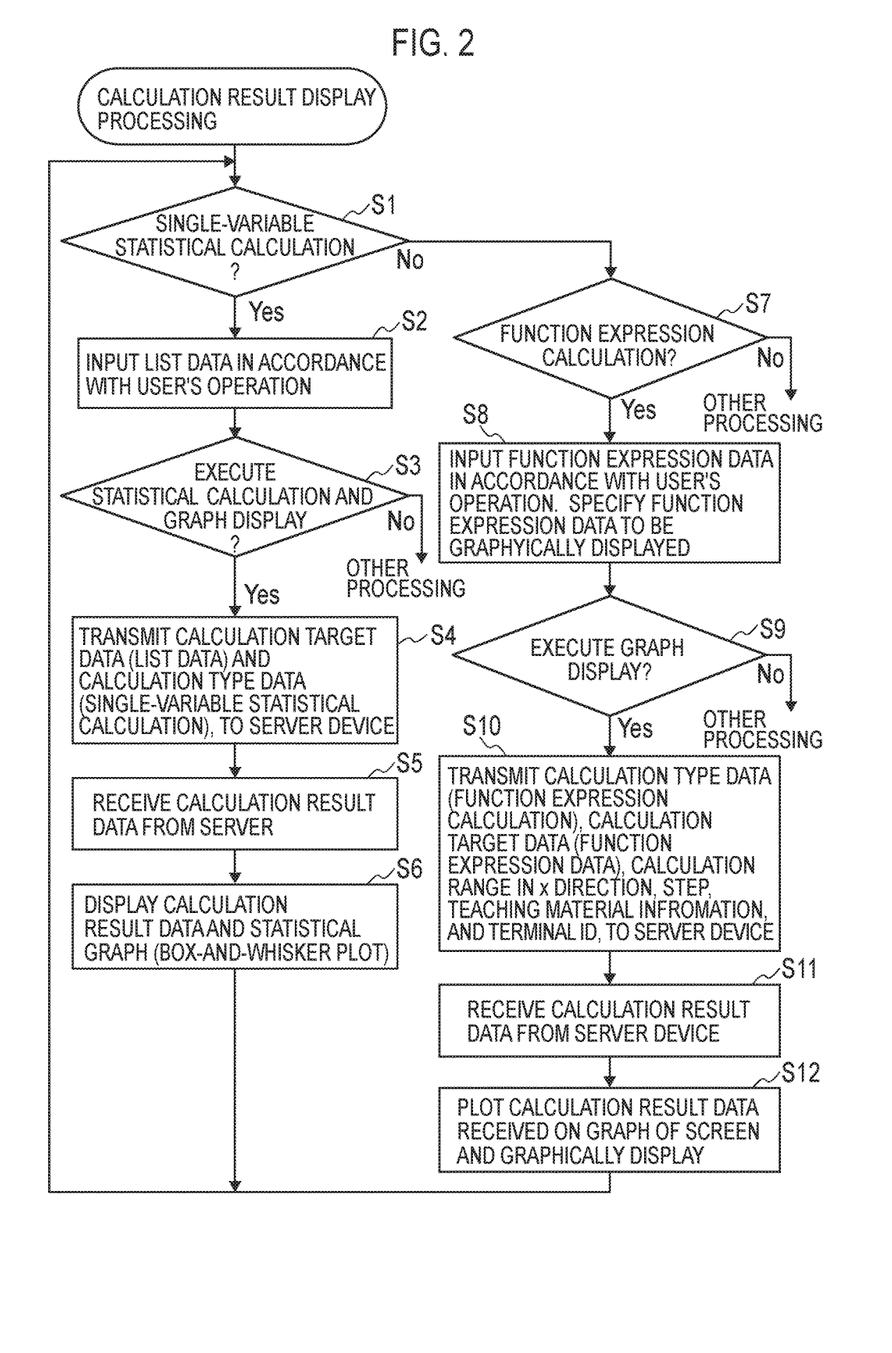

First, operation of the terminal 20 will be described with reference to a flowchart illustrated in FIG. 2, and the like. When the user operates the terminal 20 to select calculation result display processing, the CPU 21 of the terminal 20 reads the calculation result display program 261 from the storage unit 26 (see FIG. 1) to start an application of graph display processing.

Figure 3A:
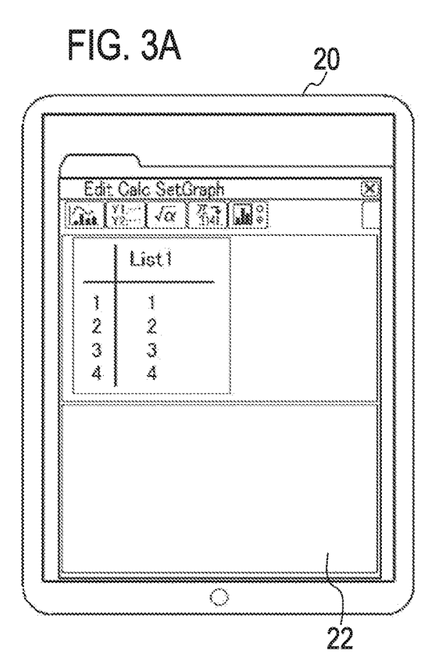
FIGS. 3A to 3D are diagrams each representing an example of a screen displayed on a display unit of the terminal.

Then, in a case where single-variable statistical calculation is selected by user's operation (step S1: Yes), the CPU 21, when the list data is input by the user by operating the keyboard or touching a keyboard-like display displayed on the display unit 22, inputs the list data in accordance with user's operation as illustrated in FIG. 3A (step S2), and temporarily stores the input list data in the list data storage area 265.

Incidentally, in a case where the single-variable statistical calculation is performed as a question of the electronic textbook or the like, the CPU 21 reads the teaching material data 263 corresponding to a teaching material specified by the user, from the storage unit 26, and displays the data on a screen of the display unit 22 (not illustrated). Then, at the point in time when the list data is input in accordance with the user's operation as described above, the teaching material information of the teaching material data 263 displayed on the screen (that is, information such as the question number, page, teaching material name (textbook name), and publisher) is temporarily stored in the teaching material information storage area 266.

Then, when operation of executing the statistical calculation and graph display is performed by the user (step S3: Yes), the CPU 21 reads the list data that is the calculation target data temporarily stored in the list data storage area 265 from the storage unit 26, and transmits the data together with the calculation type data (single-variable statistical calculation) to the server device 1 (step S4). At that time, the teaching material information (question number, page, teaching material name, publisher) and the terminal ID 262 are also read from the storage unit 26, and transmitted to the server device 1.

Incidentally, in a case where the terminal 20 has information indicating a country in which the terminal 20 is used (hereinafter, referred to as country information), the CPU 21 can also be configured to transmit the country information when transmitting the list data to the server device 1. In addition, the CPU 21 can also be configured to read information such as a country set in an operating system (OS) installed, and to transmit the information as the country information.

Figure 3B:
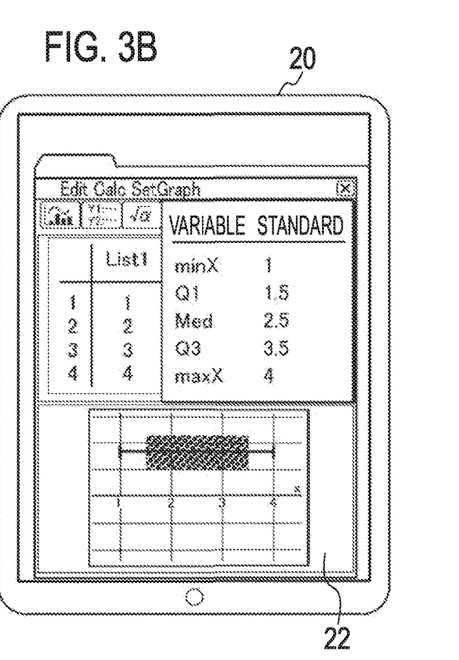

Then, the CPU 21, when receiving the calculation result data from the server device 1 (step S5), displays the calculation result data received (minX, Q1, med, Q3, maxX) and the statistical graph (box-and-whisker plot) on the screen of the display unit 22, as illustrated in FIG. 3B (step S6).

Figure 3C:
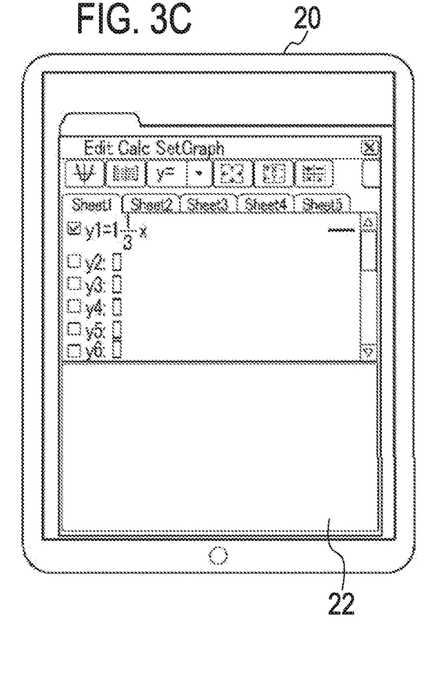

In addition, in a case where function expression calculation is selected by user's operation (step S7: Yes), the CPU 21, when the function expression data is input by the user by operating the keyboard or touching the keyboard-like display displayed on the display unit 22, inputs the function expression data in accordance with user's operation as illustrated in FIG. 3C, and specifies the function expression data to be graphically displayed (step S8), and temporarily stores the input function expression data in the function expression storage area 264.

Incidentally, also in this case, in a case where function calculation is performed as a question of the electronic textbook or the like, the CPU 21 reads the teaching material data 263 corresponding to a teaching material specified by the user, from the storage unit 26, and displays the data on the screen of the display unit 22 (not illustrated). Then, at the point in time when the function expression data is input in accordance with the user's operation as described above, the teaching material information of the teaching material data 263 displayed on the screen (that is, information such as the question number, page, teaching material name (textbook name), and publisher) is temporarily stored in the teaching material information storage area 266.

Figure 3D:
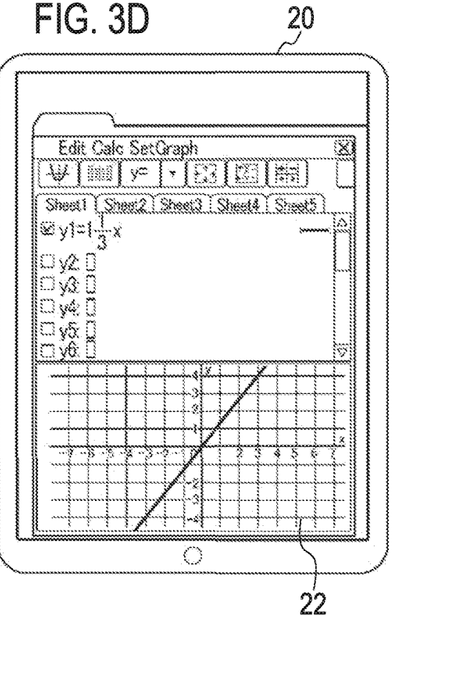

In addition, as illustrated in FIG. 3D and the like, in default, for example, a range in which the function expression data is graphically displayed (corresponding to a calculation range in the server device 1) is set to a range from −8 to +8 horizontally (x direction), and from −5 to +5 vertically (y direction), and a step (interval of x assigned to the function expression) is set to 0.2; however, in a case where the user changes the display range (calculation range) and the step, the CPU 21 temporarily stores also those data in the function expression storage area 264. Incidentally, instead of the step, it is also possible to set division number data that indicates how many divisions the calculation range in the x direction is divided into.

Then, when operation of executing the graph display is performed by the user (step S9: Yes), the CPU 21 reads the calculation type data (function expression calculation), the function expression data, the calculation range in the x direction (from −8 to +8 in default, a calculation range changed in a case where it is changed), the step (or the division number data), the teaching material information (question number, page, teaching material name, publisher), and the terminal ID 262 that are temporarily stored in the function expression storage area 264, from the storage unit 26, and transmits them to the server device 1 (step S10).

Incidentally, also in this case, in a case where the terminal 20 has country information indicating a country in which the terminal 20 is used, the CPU 21 can also be configured to transmit the country information when transmitting the function expression data and the like to the server device 1. In addition, the CPU 21 can also be configured to transmit country information set in the OS installed, to the server device 1.

Then, the CPU 21, when receiving the calculation result data from the server device 1 (step S11), as illustrated in FIG. 3D, plots the calculation result data received on a graph of the screen of the display unit 22, and graphically displays the input function expression data (step S12).

[Operation of the Server Device]

Figure 4:
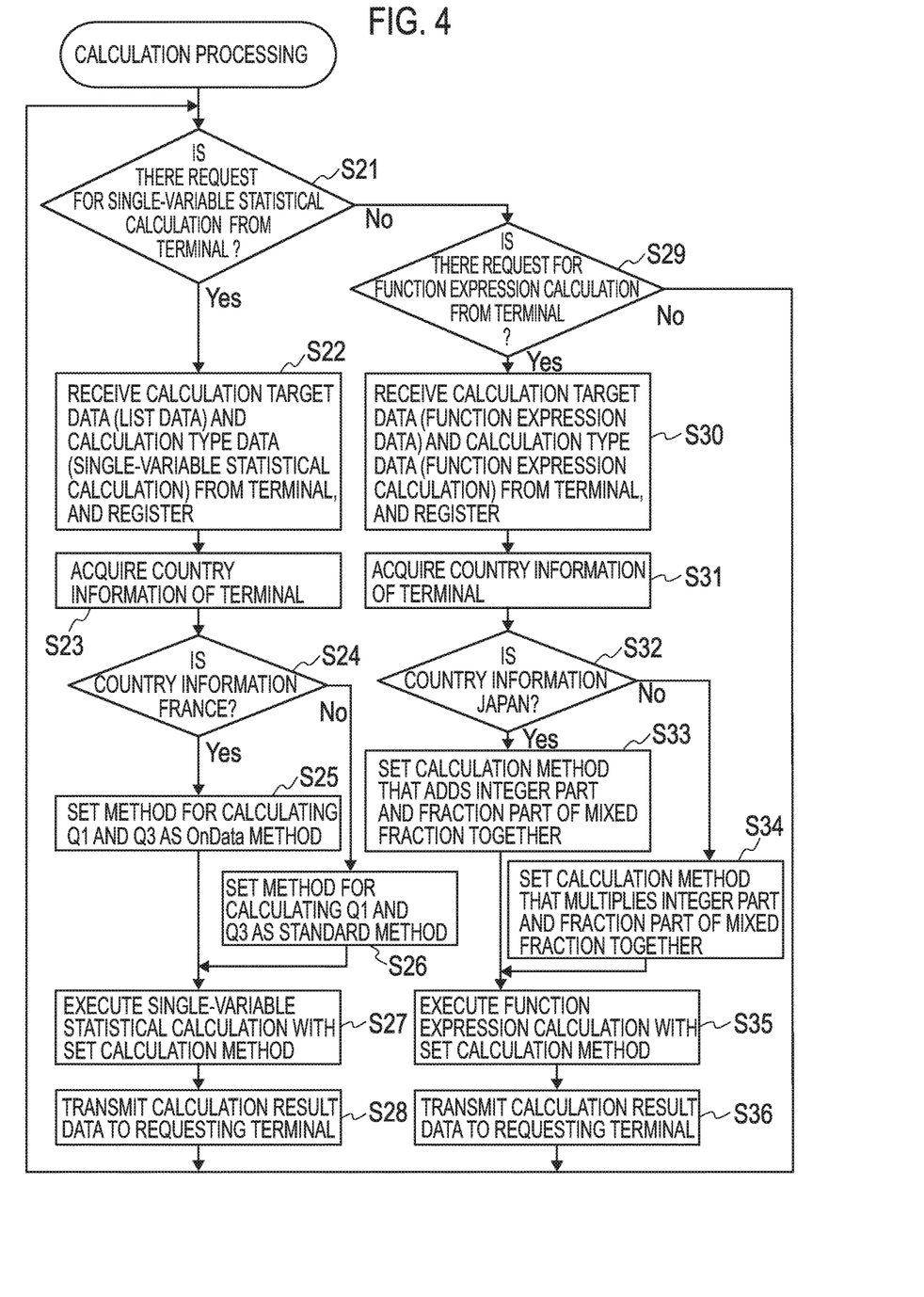

Next, operation of the server device 1 will be described with reference to a flowchart illustrated in FIG. 4, and the like. In addition, a function of the server device 1 according to the present embodiment will also be described. Incidentally, calculation processing of the server device 1 described below is performed in accordance with the calculation method and the program according to the present disclosure described above, so that the following description also describes the calculation method and the program according to the present disclosure.

When the communication unit 15 of the server device 1 receives a request for single-variable statistical calculation from any terminal 20 (step S21: Yes), calculation target data (list data), calculation type data (single-variable statistical calculation), and the like are received from the terminal 20, and the CPU 11 registers the list data and the like in the terminal DB 163 of the storage unit 16 (step S22).

Figure 5:
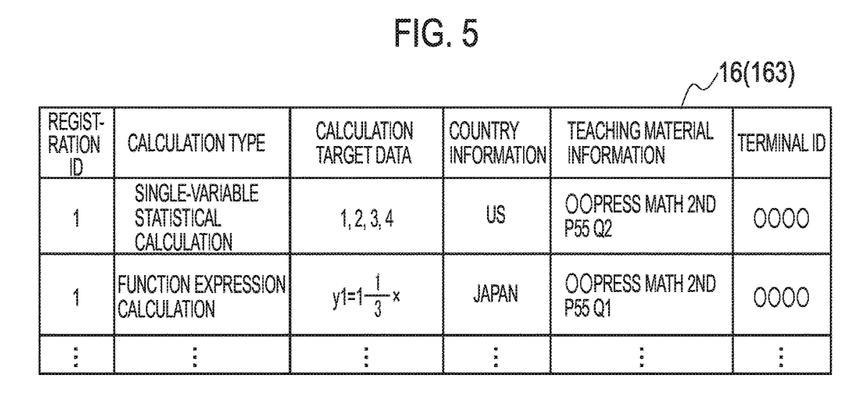
FIG. 5 is a diagram representing a configuration example of a terminal DB of a storage unit of the server device.

In the present embodiment, the terminal DB 163 has a configuration illustrated in FIG. 5, and the CPU 11, when receiving the list data (in a case of FIG. 3A, "1, 2, 3, 4") and the like from the terminal 20, attaches registration IDs to the calculation type data, the calculation target data (in this case, the list data), the teaching material information, the terminal ID, and the like, in the order of registration, and registers them in the terminal DB 163.

In addition, in the present embodiment, the CPU 11 acquires the country information of the terminal 20 transmitting the list data and the like (step S23). Incidentally, the country information may include information such as a city name in addition to a country name. Then, as described above, when the list data and the like are transmitted from the terminal 20, in a case where the terminal 20 transmits the country information of itself, the CPU 11 of the server device 1 acquires the country information transmitted from the terminal 20, and registers the country information in the terminal DB 163 in association with the list data received, as illustrated in FIG. 5.

In addition, in a case where the terminal 20 is not configured to transmit the country information, the CPU 11 can specify and acquire the country information on the basis of the terminal information of the terminal 20 itself, for example, an internet protocol (IP) address of the terminal 20. Further, the CPU 11 can be configured to acquire the country information on the basis of the teaching material information (in particular the publisher) received together with the list data as described above.

Subsequently, the CPU 11 determines whether or not the country represented by the country information acquired is France (step S24), and in a case where the country represented by the country information is France (step S24: Yes), sets the method for calculating Q1 (lower quartile value) and Q3 (upper quartile value) as the OnData method described above (step S25), and executes single-variable statistical calculation with the set calculation method (step S27).

In this way, the CPU 11 of the server device 1 performs calculation of the calculation target data with the calculation method according to the country represented by the country information, regarding the calculation type data (in this case, the list data).

Then, in the present embodiment, the CPU 11, in a case where the calculation type data is single-variable statistical calculation, and Q1 and Q3 are calculated, performs calculation with the calculation method according to the OnData method in a case where the country represented by the country information is a country in which calculation is performed with the OnData method. Incidentally, in FIG. 4, only France is included as the country in which calculation is performed with the OnData method; however, if there is a country in which calculation is performed with the OnData method in other countries, it is possible to add the country other than France to determination processing in step S24.

In addition, the CPU 11, in a case where the country represented by the country information acquired is not France (step S24: No), sets the method for calculating Q1 (lower quartile value) and Q3 (upper quartile value) as the standard method described above (step S26), and executes single-variable statistical calculation with the set calculation method (step S27).

Then, the CPU 11 causes the communication unit 15 to transmit the calculation result data that is a calculation result (in this case, minX, Q1, Med, Q3, maxX) to the requesting terminal 20 via the network (step S28), and ends a series of calculation processing, and then returns to a state waiting for the next calculation processing request.

Figure 6A:
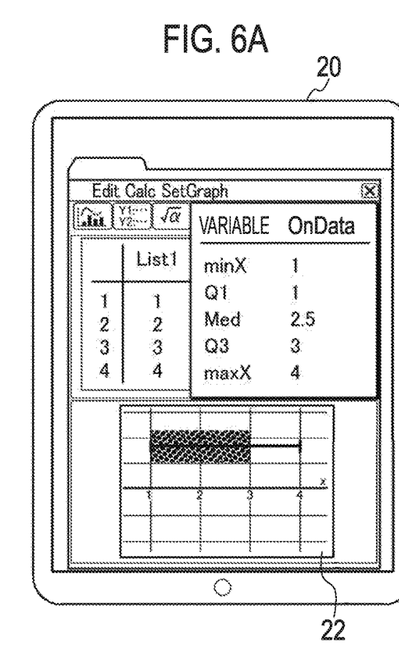
FIGS. 6A and 6B are diagrams each representing an example of the screen displayed on the display unit of the terminal.

Then, as described above, the calculation result data (Q1, Q3, and the like) and the statistical graph (box-and-whisker plot) are displayed on the screen of the display unit 22 of the terminal 20. At that time, in the country in which single-variable statistical calculation is performed with the standard method, such as Japan and the United States, the calculation result data (Q1, Q3, and the like) and the statistical graph (box-and-whisker plot) as illustrated in FIG. 3B are displayed; however, in the country in which single-variable statistical calculation is performed with the OnData method, such as France, the calculation result data (Q1, Q3, and the like) and the statistical graph (box-and-whisker plot) as illustrated in FIG. 6A are displayed.

When there is a request for function expression calculation from any terminal 20 (step S29: Yes), and the CPU 11 of the server device 1 receives the calculation target data (function expression data), the calculation type data (function expression calculation), and the like from the terminal 20, the CPU 11 registers the calculation type data, the calculation target data (function expression data), the teaching material information, the terminal ID, and the like in the terminal DB 163 of the storage unit 16, as illustrated in FIG. 5 (step S30).

In addition, in the present embodiment, the CPU 11 acquires the country information of the terminal 20 transmitting the function expression data and the like (step S31), and registers the information in the terminal DB 163 in association with the function expression data received. Incidentally, also in this case, it is possible to cause the terminal 20 to transmit the country information of itself, and the CPU 11 can be configured to determine the country information on the basis of the terminal information of the terminal 20 itself, or acquire the country information on the basis of the teaching material information (in particular the publisher) received together with the function expression data.

Subsequently, the CPU 11 determines whether or not the country represented by the country information acquired is Japan (step S32), and in a case where the country represented by the country information is Japan (step S24: Yes), sets a calculation method that adds an integer part and a fraction part of a value expressed by a mixed fraction together (hereinafter, referred to as an addition method) in a case where the function expression expressed by the mixed fraction is calculated (step S33), and executes function expression calculation with the set calculation method (step S35).

In this way, the CPU 11 of the server device 1 performs calculation of the calculation target data with the calculation method according to the country represented by the country information, regarding the calculation type data (in this case, function expression data).

Then, in the present embodiment, the CPU 11, in a case where the calculation type data is function expression calculation and the function expression expressed by the mixed fraction is calculated, performs calculation with the calculation method according to the addition method in a case where the country represented by the country information is a country in which calculation is performed with the addition method. Incidentally, in FIG. 4, only Japan is included as the country in which calculation is performed with the addition method; however, if there is a country in which calculation is performed with the addition method in countries other than Japan, it is possible to add the country other than Japan to determination processing in step S32.

In addition, the CPU 11, in a case where the country represented by the country information acquired is not Japan (step S32: No), sets a calculation method that multiplies the integer part and the fraction part of the value expressed by the mixed fraction (hereinafter, referred to as a multiplication method) in a case where the function expression expressed by the mixed fraction is calculated (step S34), and executes function expression calculation with the set calculation method (step S35).

Then, the CPU 11 causes the communication unit 15 to transmit the calculation result data that is a calculation result to the requesting terminal 20 via the network (step S36), and ends a series of calculation processing, and then returns to a state waiting for the next calculation processing request.

Figure 6B:
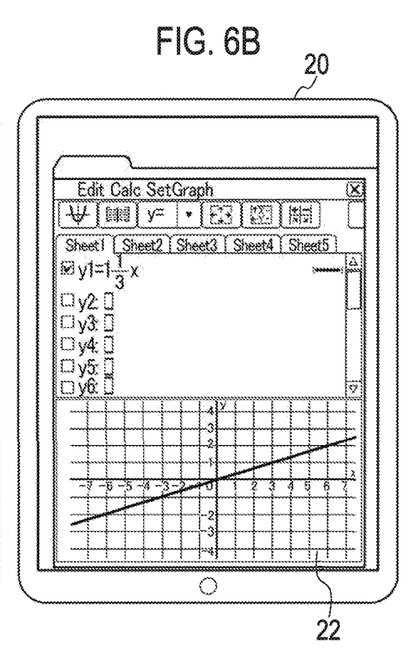

Then, as described above, the CPU 21 of the terminal 20, when receiving the calculation result data from the server device 1, plots the calculation result data received on a graph of the screen of the display unit 22, and graphically displays the input function expression data. At that time, in the country in which function expression calculation is performed by calculating the mixed fraction with the addition method, such as Japan, the graph as illustrated in FIG. 3D is displayed; however, in the country in which function expression calculation is performed by calculating the mixed fraction with the multiplication method, other than Japan, the graph as illustrated in FIG. 6B is displayed.

[Effects]

As described above, with the server device 1, the calculation method, and the program according to the present embodiment, the CPU 11 of the server device 1, regarding the calculation type data transmitted together with the calculation target data (list data and function expression data), properly sets the calculation method according to the country represented by the country information acquired, and executes calculation of the calculation target data with the calculation method set, and then transmits the calculation result data to the terminal 20.

For that reason, even in a case where the calculation method differs for each country, even if the user does not set the calculation method and the country information, the server device 1 can appropriately determine the country information, and automatically and appropriately set the calculation method according to the country represented by the country information, to perform calculation. Accordingly, in a case of single-variable statistical calculation, calculation is performed with the standard method in Japan, the United States, and the like, but calculation is performed with the OnData method in France; in a case where the mixed fraction is described in the function expression data in function expression calculation, calculation is performed with the addition method allowing the mixed fraction to be used in Japan, but calculation is performed with the multiplication method not allowing the mixed fraction to be used in the function expression in Europe, the United States, and the like.

For that reason, it is not necessary for the user to set the calculation method or input the country information for each time during SETUP, and it saves time and effort for the user, and it is possible to make the user feel convenience.

In the above, the embodiments of the present disclosure have been described; however, the scope of the present disclosure is not limited to the embodiments described above, and includes the range of the disclosure described in the claims and the range equivalent thereto.

The invention claimed is:

1. A server device comprising:
a processor,
wherein the processor is configured to:
receive calculation target data and calculation type data from a terminal;
acquire country information;
perform calculation of the calculation target data with a calculation method according to the country information regarding the calculation type data; and
transmit calculation result data that is a calculation result calculated by the calculation unit, to the terminal, and
wherein, in a case where the calculation type data is single-variable statistical calculation and at least one of a lower quartile value and an upper quartile value is calculated, the processor is configured to perform the calculation of the calculation target data with the calculation method being one of (i) a standard method in a case where a country represented by the country information is a country in which calculation is performed with the standard method, and (ii) an OnData method in a case where a country represented by the country information is a country in which calculation is performed with the OnData method.

2. The server device according to claim 1, wherein in processing of acquiring the country information of the terminal, the processor is configured to specify and acquire the country information based on terminal information of the terminal itself.

3. The server device according to claim 1, wherein in processing of acquiring the country information of the terminal, the processor is configured to acquire transmitted country information by acquiring country information of a location of the terminal.

4. The server device according to claim 3, wherein in processing of acquiring the country information of the location of the terminal, the processor is configured to acquire the country information based on teaching material information of a teaching material corresponding to the calculation target data transmitted from the terminal.

5. The server device according to claim 1, wherein, in a case where the calculation type data is function expression calculation and a function expression expressed by a mixed fraction is calculated, the processor is configured to perform the calculation of the calculation target data with the calculation method being one of (i) a first calculation method that adds an integer part and a fraction part of a value expressed by the mixed fraction together in a case where a country represented by the country information is a country in which the mixed fraction is allowed to be used in the function expression, and (ii) a second calculation method that multiplies the integer part and the fraction part of the value expressed by the mixed fraction together in a case where the country represented by the country information is a country in which the mixed fraction is not allowed to be used in the function expression.

6. A calculation method of a server device, the calculation method comprising:
receiving calculation target data and calculation type data from a terminal;
acquiring country information of the terminal;
performing calculation of the calculation target data with a calculation method according to the country information regarding the calculation type data; and
transmitting, to the terminal, calculation result data that is a calculation result of the calculation,
wherein, in a case where the calculation type data is single-variable statistical calculation and at least one of a lower quartile value and an upper quartile value is calculated, the calculation of the calculation target data is performed with the calculation method being one of (i) a standard method in a case where a country represented by the country information is a country in which calculation is performed with the standard method, and (ii) an OnData method in a case where a country represented by the country information is a country in which calculation is performed with the OnData method.

7. The calculation method according to claim 6, wherein the acquiring the country information of the terminal comprises specifying and acquiring the country information based on terminal information of the terminal itself.

8. The calculation method according to claim 6, wherein the acquiring the country information of the terminal comprises acquiring transmitted country information of a location of the terminal and acquiring the country information transmitted.

9. The calculation method according to claim 8, wherein the acquiring the transmitted country information of the location of the terminal comprises acquiring the country information based on teaching material information of a teaching material corresponding to the calculation target data transmitted from the terminal.

10. The calculation method according to claim 6, wherein, in a case where the calculation type data is function expression calculation and a function expression expressed by a mixed fraction is calculated, the calculation of the calculation target data is performed with the calculation method being one of (i) a first calculation method that adds an integer part and a fraction part of a value expressed by the mixed fraction together in a case where a country represented by the country information is a country in which the mixed fraction is allowed to be used in the function expression, and (ii) a second calculation method that multiplies the integer part and the fraction part of the value expressed by the mixed fraction together in a case where the country represented by the country information is a country in which the mixed fraction is not allowed to be used in the function expression.

11. A non-transitory recording medium recording a program executable by a processor of a server device, the server device comprising the processor and a communication unit configured to communicate with a terminal, and the program causing the processor to:

receive calculation target data and calculation type data from the terminal;
acquire country information;
perform calculation of the calculation target data with a calculation method according to the country information regarding the calculation type data; and
transmit calculation result data that is a calculation result of the calculation to the terminal,
wherein, in a case where the calculation type data is single-variable statistical calculation and at least one of a lower quartile value and an upper quartile value is calculated, the program causes the processor to perform the calculation of the calculation target data with the calculation method being one of (i) a standard method in a case where a country represented by the country information is a country in which calculation is performed with the standard method, and (ii) an OnData method in a case where a country represented by the country information is a country in which calculation is performed with the OnData method.

* * * * *